United States Patent [19]

Sando et al.

[11] Patent Number: 5,064,690

[45] Date of Patent: Nov. 12, 1991

[54] METHOD FOR COATING SURFACE OF INACTIVE GRANULES

[75] Inventors: Mutsuo Sando, Nagoya; Masanobu Awano, Chikusa, both of Japan

[73] Assignees: Agency of Industrial Science & Technology; Ministry of International Trade & Industry, both of Tokyo, Japan

[21] Appl. No.: 492,060

[22] Filed: Mar. 12, 1990

[30] Foreign Application Priority Data

Mar. 28, 1989 [JP] Japan ............... 1-76183

[51] Int. Cl.$^5$ ............................... B05D 7/24
[52] U.S. Cl. .......................... 427/215; 427/419.2; 419/35; 106/243
[58] Field of Search ........... 427/215, 216, 327, 372.2, 427/435, 419.2; 419/19, 35, 36; 423/592; 501/102, 153; 106/243; 502/170, 171

[56] References Cited

U.S. PATENT DOCUMENTS

| | | | |
|---|---|---|---|
| 3,522,078 | 7/1970 | May, Jr. et al. | 427/215 |
| 3,522,079 | 7/1970 | Wiseman | 427/215 |
| 4,376,721 | 3/1983 | Huang | 502/171 |
| 4,772,576 | 9/1988 | Kimura et al. | 423/593 |
| 4,806,428 | 2/1989 | Cooper et al. | 428/403 |
| 4,900,587 | 2/1990 | Ritsko et al. | 427/216 |
| 4,900,701 | 2/1990 | Morishita et al. | 501/102 |

FOREIGN PATENT DOCUMENTS 59-25901  2/1984  Japan ................. 427/215

*Primary Examiner*—Michael Lusignan
*Assistant Examiner*—Terry J. Owens
*Attorney, Agent, or Firm*—Oblon, Spivak, McClelland, Maier & Neustadt

[57] ABSTRACT

A method for coating the surface of inactive granules comprises dispersing inactive granules having water adsorbed in advance on the surface thereof in a solution having a higher fatty acid and a metal alkoxide dissolved in small amounts in a non-hydrophilic organic solvent thereby forming on the surface of the granules a dense layer of microfine metal oxide powder produced in consequence of hydrolysis of the metal alkoxide.

14 Claims, No Drawings

METHOD FOR COATING SURFACE OF INACTIVE GRANULES

BACKGROUND OF THE INVENTION

1. Field of the Invention

This invention relates to a method for coating the surface of inactive granules closely with a layer of fine metal oxide powder several nanometers in thickness. More particularly, this invention relates to a method for coating the surface of inactive granules by causing inactive granules having water adsorbed in advance on the surface thereof to contact a metal alkoxide thereby hydrolyzing the metal alkoxide and consequently covering the granules with the hydrolysate.

The method of this invention finds utility in such applications as production of a sintering auxiliary.

2. Prior Art Statement

As methods heretofore commonly employed for the production of granules coated with a layer of fine metal oxide powder several nanometers in thickness, there can be mentioned a method which comprises mutual adsorption between particles of a microfine powder approximately not more than 10 nm in diameter and granules approximately 1 μm in diameter through the medium of a surfactant by adjusting the delta (δ) potential and controlling the pH value [S. Hirano, Design of Complex Material II Organic Complex Material, (Progress of Chemical Industry 23 Molecule Chemical Industry Chapter 7) edited by Chemical Engineering Society], a method which comprises thoroughly mixing a microfine powder and granules in a liquid and spray drying the resultant mixture [Y. Kawashima Journal of Color Material Society, Vol. 55(9), p 657 (1982), and a method which comprises subjecting a microfine powder and granules to mutual friction in dry air thereby attaining mutual adhesion therebetween by virtue of static electric power [F. Yokoyama et al, Abstracts of Papers Read at Granule Formulation and Design Symposium p 67 (1986)]. In case of these conventional methods, the success of the deposition of a microfine powder on granules is at the mercy of probability and the control of layer thickness requires considerable knowhow. In the products of these methods, the coating layer is a coarse film formed by mere cohesion of the particles of microfine powder and the ratio of microfine powder which escapes cohesion is large. The methods, further, have a disadvantage that they are not capable of easily producing a submicron order coat of high economic value.

In the circumstances, it is necessary to develop a method capable of coating inactive granules with a dense layer of microfine powder without entailing any of the drawbacks mentioned above.

This invention has been produced to meet this need. An object of this invention is to provide a method for coating the surface of inactive granules with a dense layer of microfine powder and a convenient method for allowing free control of the thickness of the layer to be formed as described above.

SUMMARY OF THE INVENTION

The present inventors continued a study with a view to establishing a method for coating the surface of inactive granules. They have consequently found that the purpose of coating the surface of inactive granules with a layer of controlled thickness is attained by causing local hydrolysis of a metal alkoxide on the surface of the granules thereby inducing fast deposition of a dense layer of microfine metal oxide powder on the surface of the granules. The present invention has been perfected as a result.

Specifically, this invention concerns a method for coating inactive granules, which essentially consists of causing inactive granules having adsorbed water on the surface thereof to contact a composition comprising a non-hydrophilic organic solvent, 0.5 to 20% by weight, based on the amount of the solvent, of a metal alkoxide, and a small amount of a higher fatty acid thereby forming on the surface of the inactive granules a dense layer of microfine metal oxide powders formed in consequence of hydrolysis of the metal alkoxide.

DETAILED DESCRIPTION OF THE PREFERRED EMBODIMENTS

Now, the present invention will be described in detail below.

The inactive granules to be used in this invention are not particularly defined. For the adsorption of water by the granules, it suffices to have water adsorbed by alumina or zirconia granules of a BET specific surface area of 5 to 15 $m^2$ on their surface in a desired amount in the range of 0.1 to 30 mg per $m^2$ of the surface area, with the aforementioned desired amount attained by adjusting relative humidity and adsorption time. Since the amount of water to be adsorbed determines the thickness of the produced coating layer, the water is adsorbed in an amount necessary for the metal oxide coating the surface of the inactive granules to be obtained by hydrolysis of a metal alkoxide.

The non-hydrophilic organic solvents which are usable advantageously in the present invention include aromatic hydrocarbons such as benzene, toluene, and xylene and oil fractions such as kerosene and ligroin, for example. Among other non-hydrophilic organic solvents mentioned above, benzene and ligroin prove to be particularly desirable for practical use. The higher fatty acids which are usable for the addition to the solvent include fatty acids having 10 to 30 carbon atoms. To be concrete, these fatty acids are n-caproic acid, n-capric acid, n-caprylic acid, lauric acid, myristic acid, palmitic acid, and stearic acid. Among the higher fatty acids mentioned above, stearic acid and n-caproic acid prove to be particularly desirable for practical use. The amount of the higher fatty acid to be used is in the range of 0.005 to 0.05 mol per liter of the solution. Generally, the concentration of the fatty acid is desired to be equivalent to the reverse micellar concentration.

The metal alkoxide to serve as the raw material for a coating layer for the inactive granules is not particularly defined. There are alkoxides of low reactivity and alkoxides of high reactivity. Those of the former type are represented by silicon methoxide and silicon ethoxide and those of the latter type are represented by tin ethoxide, zinc ethoxide, zirconium propoxide, and zirconium butoxide. The amount of an alkoxide of low reactivity is in the range of 5 to 20% by weight and that of an alkoxide of high reactivity in the range of 0.5 to 5% by weight.

The method of this invention is conducted by keeping the dilute solution of the alkoxide in the organic solvent vigorously agitated by means of ultrasonic waves or by the use of a stirrer and, at the same time, adding the inactive granules in hydrated form piecemeal and dropwise to the stirred solution thereby inducing hydrolysis of the alkoxide on the surface of the granules. The reaction time is in the range of several hours to some tens of hours when the alkoxide of low reactivity is used or in the range of several minutes to some tens of minutes when the alkoxide of high reactivity is used. When the alkoxide to be used is of the type having high reactivity, the method may be carried out by first dispersing the granules in hydrated form in the non-hydrophilic organic solvent having the higher fatty acid alone dissolved in advance therein, then keeping the resultant dispersion of granules agitated and, at the same time, adding dropwise to the stirred dispersion the metal alkoxide diluted with the non-hydrophilic organic solvent to about 10 times the original volume until the concentration of the granules reaches a prescribed level thereby inducing hydrolysis of the metal hydroxide. The amount of the hydrated granules to be added to the non-hydrophilic organic solvent is desired to be not more than 100 g per liter of the organic solvent.

The amount of the metal alkoxide to be contained at this time in the non-hydrophilic organic solvent is desired to be in the range of several times to several hundred times the amount stoichiometrically estimated to be completely hydrolyzed locally by the water adsorbed on the inactive granules, specifically several times to some tens of times the amount consumed for the local hydrolysis when the alkoxide is of the type having high reactivity or in the range of some tens of times to several hundred times the amount consumed for the local hydrolysis when the alkoxide is of the time of low reactivity.

After the adsorbed water on the surface of the granules has been consumed by the hydrolysis of the metal hydroxide and the coating of the surface of the granules with the metal oxide has been completed, the reaction mixture is separated into the granules and the organic solvent containing the unaltered metal alkoxide by centrifugal separation and then the separated granules are washed several times with an organic solvent for expulsion of the unaltered alkoxide from the granules. After this washing is completed, the granules are dispersed in such a solvent as methyl alcohol which has low surface tension. The resultant dispersion is vacuum dried first at low temperatures to effect gradual vaporization of the solvent and then at high temperatures in the neighborhood of 200° C. for desiccation of the granules. If the fatty acid is adhering to the dried granules, the granules are heattreated in the air at 300° C. to 400° C. thereby inducing oxidative decomposition of the fatty acid and consequent formation of a coating layer of high purity having a controlled thickness. The thickness of the coating layer which is formed by the method of this invention can be controlled in the range of 1 to 20 nm.

The coating formed on the surface of the inactive granules by the method of this invention is a dense layer formed of microfine metal oxide powder. The thickness of this layer can be controlled as desired. Thus, this method proves to be highly advantageous from the economic point of view.

Now, the present invention will be described more specifically below with reference to working examples.

EXAMPLE 1

In an organic solvent having 4 cc of silicon ethoxide and 0.15 g of stearic acid dissolved in 36 cc of ligroin, 1 g of high-purity alumina powder possessing a BET specific surface area of 13 $m^2/g$ and having 5 mg of water adsorbed in advance per unit surface area was dispersed by ultrasonic waves. The resultant dispersion was washed once with ligroin and agitated at 240 rpm with a stirrer and, at the same time, left reacting at 25° C. for 50 hours. Then, the reaction product was treated with ultrasonic waves for dispersion of the powder, washed three times with methyl alcohol, dried at room temperature, and further vacuum dried at 200° C. As the result, there were obtained alumina granules coated with silica.

By observation under analytical electron microscope, chemical analysis, and measurement of specific surface area, these granules were found to be alumina granules uniformly coated with microfine silica powder. The results of the analysis are shown in the accompanying table.

EXAMPLE 2 AND 3

Alumina granules coated with silica were obtained by following the procedure of Example 1, except that alumina granules having adsorbed water in advance thereon in an amount per unit surface area indicated in the table were used in the reaction. The results of analysis are shown in the table.

| Example | Sample | Amount of silica (% by weight) | Specific surface area ($m^2/g$) | Thickness of coating layer |
|---|---|---|---|---|
| 1 | 5 mg/$m^2$ of adsorbed water | 5.2 | 17 | 1.4 nm |
| 2 | 10 mg/$m^2$ of adsorbed water | 7.1 | 26 | 1.9 nm |
| 3 | 14 mg/$m^2$ of adsorbed water | 7.7 | 30 | 2.1 nm |

EXAMPLE 4

Coated granules were produced by following the procedure of Example 1, except that benzene was used in the place of ligroin. By observation under an analytic electron microscope, they were found to be alumina granules coated uniformly with microfine silica powder.

EXAMPLE 5

Coated granules were produced by following the procedure of Example 1, except that 0.2 g of n-caproic acid was used in the place of 0.15 g of stearic acid. By observation under an analytic electron microscope, they were found to be alumina granules coated uniformly with microfine alumina powder.

EXAMPLE 6

Zirconia granules coated with silica were obtained by following the procedure of Example 1, except that zirconia granules possessing a specific surface area of 18 $m^2/g$ and having adsorbed thereon 7 mg of water per unit surface area were used in the place of alumina granules. By observation under an analytical electron microscope, they were found to be zirconia particles coated uniformly with microfine silica powder.

EXAMPLE 7

In an organic solvent having 0.15 g of stearic acid dissolved in 40 cc of ligroin, 1 g of alumina possessing a specific surface area of 13 $m^2/g$ and having 7 mg of water adsorbed thereon per unit surface area was dispersed with ultrasonic waves. The resultant dispersion was kept agitated with a stirrer and, at the same time, 5 cc of ligroin containing 10% of zirconium propoxide was added dropwise and left reacting for 2 minutes. The resultant reaction product was washed twice with ligroin and twice more with methyl alcohol, dried at room temperature, and further dried at 200° C., to afford alumina granules coated with zirconia. By observation under an analytical electron microscope, they were found to be alumina granules coated uniformly with microfine zirconia powder.

EXAMPLE 8

An organic solvent having 0.15 g of stearic acid and 0.2 g of tin ethoxide dissolved in 40 cc of ligroin was kept agitated and, at the same time, 1 g of alumina granules possessing a specific surface area of 13 m$^2$/g and having 7 mg of water adsorbed in advance thereon per unit surface area were added piecemeal and dropwise and left reacting for 5 minutes.

Then, the reaction product was washed twice with ligroin and then twice with methyl alcohol, and dried, to afford granules. By observation under an analytical electric microscope, they were found to be alumina granules coated uniformly with microfine tin powder.

What is claimed is:

1. A method for coating inactive granules, consisting essentially of causing inactive granules having water adsorbed in advance on the surface thereof to contact a composition comprising a non-hydrophilic organic solvent 0.5 to 20 wt%, based on said solvent, of a metal alkoxide, and a higher fatty acid present in an amount in the range of 0.005 to 0.05 mol per liter of said non-hydrophilic organic solvent, thereby forming on the surface of said inactive granules a dense layer of microfine metal oxide powder formed in consequence of the hydrolysis of said metal alkoxide.

2. A method according to claim 1, wherein said non-hydrophilic organic solvent is one member selected from the group consisting of benzene, toluene, xylene, kerosene, and ligroin.

3. A method according to claim 2, wherein said non-hydrophilic organic solvent is one member selected from the group consisting of benzene and ligroin.

4. A method according to claim 1, wherein said higher fatty acid is one member selected from among fatty acids of 10 to 30 carbon atoms.

5. A method according to claim 4, wherein said higher fatty acid is one member selected from the group consisting of n-caproic acid, n-capric acid, n-capyrlic acid, lauric acid, myristic acid, palmitic acid, and stearic acid.

6. A method according to claim 5, wherein said higher fatty acid is one member selected from the group consisting of stearic acid and n-caproic acid.

7. A method according to claim 1, wherein said metal alkoxide is one member selected from the group consisting of silicon methoxide and silicon ethoxide.

8. A method according to claim 7, wherein said metal alkoxide is used in an amount in the range of 5 to 20% by weight based on the amount of said non-hydrophilic organic solvent.

9. A method according to claim 1, wherein said metal alkoxide is one member selected from the group consisting of tin ethoxide, zinc ethoxide, zirconium propoxide, and zirconium butoxide.

10. A method according to claim 9, wherein said metal alkoxide is used in an amount in the range of 0.5 to 5% by weight based on the amount of said non-hydrophilic organic solvent.

11. A method according to claim 1, wherein said inactive granules are dispersed in said non-hydrophilic organic solvent having said higher fatty acid and said metal alkoxide dissolved therein.

12. A method according to claim 1, wherein said inactive granules are dispersed in said non-hydrophilic organic solvent having said higher fatty acid and said metal alkoxide dissolved therein and then a mixed liquid consisting of said non-hydrophilic organic solvent and said metal alkoxide is added to the resultant dispersion of said inorganic granules.

13. A method according to claim 1, wherein the thickness of said dense layer formed on the surface of said granules is controlled by the amount of water adsorbed on the surface of said granules.

14. A method according to claim 1, wherein said dense layer has a thickness in the range of 1 to 20 nm.

* * * * *